United States Patent
Hayashi (10) Patent No.: US 9,485,751 B2
(45) Date of Patent: Nov. 1, 2016

(54) MOBILE COMMUNICATION SYSTEM, MULTICAST DATA DISTRIBUTION METHOD, CORE NETWORK APPARATUS, AND ACCESS NETWORK APPARATUS

(75) Inventor: Sadafuku Hayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 13/554,941

(22) Filed: Jul. 20, 2012

(65) Prior Publication Data
US 2012/0287840 A1 Nov. 15, 2012

Related U.S. Application Data (63) Continuation of application No. 12/524,985, filed as application No. PCT/JP2007/074050 on Dec. 13, 2007.

(30) Foreign Application Priority Data

Jan. 30, 2007 (JP) .................................. 2007-019071

(51) Int. Cl.
H04W 4/06 (2009.01)
H04W 72/00 (2009.01)
H04W 76/00 (2009.01)

(52) U.S. Cl.
CPC ......... *H04W 72/005* (2013.01); *H04W 76/002* (2013.01)

(58) Field of Classification Search
None
See application file for complete search history.

(56) References Cited

U.S. PATENT DOCUMENTS

| 2003/0194992 A1 | 10/2003 | Kim et al. |
| 2005/0111395 A1 | 5/2005 | Hwang et al. |
| 2005/0185620 A1 | 8/2005 | Lee et al. |
| 2005/0192021 A1 | 9/2005 | Lee et al. |
| 2010/0027541 A1* | 2/2010 | Eriksson et al. ............. 370/390 |

FOREIGN PATENT DOCUMENTS

| JP | 2003216522 A | 7/2003 |
| JP | 2004-040770 A | 2/2004 |
| JP | 2004-135260 A | 4/2004 |
| JP | 2004135080 A | 4/2004 |

(Continued)

OTHER PUBLICATIONS

"MBMS Context Extension," Huawei Technologies, 3GPP Draft; S2-021185, TSG-SA WG2 #24, Madrid, Spain, May 2, 2002, 2 pages.

(Continued)

*Primary Examiner* — Faruk Hamza
*Assistant Examiner* — Alan Lindenbaum
(74) *Attorney, Agent, or Firm* — Sughrue Mion, PLLC (57) ABSTRACT

A core network apparatus notifies a piece of identification information on each service for receiving multicast data in a down link to an access network apparatus. The access network apparatus receives the piece of the identification information notified from the core network apparatus to capture a radio channel for the service identified by the piece of the identification information. The core network apparatus transmits the multicast data to the access network apparatus in a receivable form on the basis of the piece of the identification information. The access network apparatus receives the multicast data transmitted from the core network apparatus on the basis of the piece of the identification information and transmits the received multicast data to terminals over the radio channel.

10 Claims, 8 Drawing Sheets

(56) References Cited

FOREIGN PATENT DOCUMENTS

| | | |
|---|---|---|
| JP | 2004-166197 A | 6/2004 |
| JP | 2005-506800 A | 3/2005 |
| JP | 2005-229447 A | 8/2005 |
| JP | 2005-530451 A | 10/2005 |
| JP | 2007-13977 A | 1/2007 |
| JP | 2007-503753 A | 2/2007 |
| JP | 2007-531425 A | 11/2007 |
| JP | 2008-529447 A | 7/2008 |
| KR | 1020050020458 A | 3/2008 |
| WO | 2005013514 A1 | 2/2005 |
| WO | 2005/020461 A1 | 3/2005 |
| WO | 2005/020472 A1 | 3/2005 |
| WO | 2005/067172 A | 7/2005 |
| WO | 2006/083207 A1 | 8/2006 |
| WO | 2007/010983 A1 | 1/2007 |

OTHER PUBLICATIONS

Extended European Search Report, dated Sep. 27, 2012, issued by the European Patent Office in counterpart European Patent Application No. 12180909.9.
Office Action dated Dec. 18, 2012, issued by the Japanese Patent Office in counterpart Japanese Application No. 2011-232785.
3rd Generation Partnership Project; Technical Specification Group Services and System Aspects; Multimedia Broadcast/Multicast Service (MBMS); Architecture and functional description (Release 7), 3GPP TS 23.246 V7.1.1, (Dec. 2006), 53 Pages Total.
Office Action dated Dec. 18, 2012, issued by the Japanese Patent Office in counterpart Japanese Application No. 2012-245682.
3rd Generation Partnership Project; Technical Specification Group Radio Access Network; UTRAN Iu interface RANAP signalling (Release 7), 3GPP TS 25.413 V7.4.0, (Dec. 2006).
3rd Generation Partnership Project; Technical Specification Group Radio Access Network; UTRAN Iu interface RANAP signalling (Release 7), 3GPP TS 25.414 V7.1.0, (2006-19).
Office Action dated May 13, 2011 from the Korean Patent Office in counterpart Korean application No. 10-2009-7018002.
Technical Specification, Universal Mobile Telecommunications System (UMTS); Multiedia Broadcast/Multicast Service (MBMS); Architecture and functional description, ETSI-TS-123-246, version 6.11.1, (Dec. 2006).
Liaison Statement on Service Id needs in the Access, 3GPP-TSG-SA2-#33, Jul. 7-11, 2003.
MBMS Service Areas, 3GPP-TSG-RAN#42, May 10-14, 2004.
European Search Report issued Jan. 26, 2012, by the European Patent Office in counterpart European Application No. 07859813.3.
Final Office Action mailed Oct. 26, 2012 for corresponding U.S. Appl. No. 12/524,985.
Search Report dated Feb. 8, 2013, issued by the European Patent Office in counterpart European Patent Application No. 12199723.3.
"3rd Generation Partnership Project; Technical Specification Group Radio Access Network; Evolved UTRA and UTRAN; Radio Access Architecture and Interfaces (Release 7)", 3GPP Draft; TR R3.018 V0.6.0 (CLEAN), 3rd Generation Partnership Project (3GPP), Mobile Competence Centre; 650, Route Des Lucioles; F-06921 Sophia-Antipolis Cedex; France, vol. RAN WG3, Nov. 13, 2006 (Oct. 2006); pp. 121 total.
Office Action dated Nov. 18, 2013 issued by the Japanese Patent Office in counterpart Japanese Patent Application No. 2013092305.

* cited by examiner

Fig.1

| Bits | | | | | | | |
|---|---|---|---|---|---|---|---|
| 8 | 7 | 6 | 5 | 4 | 3 | 2 | 1 |
| Version | | | PT | (*) | E | S | PN |
| Message Type | | | | | | | |
| Length (1st Octet) | | | | | | | |
| Length (2nd Octet) | | | | | | | |
| Tunnel Endpoint Identifier (1st Octet) | | | | | | | |
| Tunnel Endpoint Identifier (2nd Octet) | | | | | | | |
| Tunnel Endpoint Identifier (3rd Octet) | | | | | | | |
| Tunnel Endpoint Identifier (4th Octet) | | | | | | | |
| Sequence Number (1st Octet) | | | | | | | |
| Sequence Number (2nd Octet) | | | | | | | |
| N-PDU Number | | | | | | | |
| Next Extension Header Type | | | | | | | |
| SDU (Service Data Unit) | | | | | | | |

| IE/Group Name | Presence | Range |
|---|---|---|
| Message Type | M | |
| TMGI | M | |
| Transport Layer Information | O | |
| >Iu Transport Association | M | |
| QoS Label | M | |
| MBMS Session Duration | M | |
| MBMS Service Area | M | |
| Frequency Layer Convergence Flag | O | |
| RA List of Idle Mode UEs | O | |

Fig. 11

Bits

| 8 | 7 | 6 | 5 | 4 | 3 | 2 | 1 |
|---|---|---|---|---|---|---|---|
| Version | | | PT | (*) | E | S | PN |
| Message Type | | | | | | | |
| Length (1$^{st}$ Octet) | | | | | | | |
| Length (2$^{nd}$ Octet) | | | | | | | |
| MBMS Indicator | | | | | | | |
| Tunnel Endpoint Identifier (1$^{st}$ Octet) | | | | | | | |
| Tunnel Endpoint Identifier (2$^{nd}$ Octet) | | | | | | | |
| Tunnel Endpoint Identifier (3$^{rd}$ Octet) | | | | | | | |
| Tunnel Endpoint Identifier (4$^{th}$ Octet) | | | | | | | |
| Sequence Number (1$^{st}$ Octet) | | | | | | | |
| Sequence Number (2$^{nd}$ Octet) | | | | | | | |
| N-PDU Number | | | | | | | |
| Next Extension Header Type | | | | | | | |
| SDU (Service Data Unit) | | | | | | | |

MOBILE COMMUNICATION SYSTEM, MULTICAST DATA DISTRIBUTION METHOD, CORE NETWORK APPARATUS, AND ACCESS NETWORK APPARATUS

This is a continuation of application Ser. No. 12/524,985 filed Jul. 29, 2009, which priority is claimed on Japanese Patent Application No. 2007-019071 filed Jan. 30, 2007, which is a national stage of PCT/JP2007/074050 the contents of which are incorporated by reference.

TECHNICAL FIELD

The present invention relates to a mobile communication system that can multicast data to terminals.

BACKGROUND ART

Presently, 3GPP discusses a next generation mobile communication system as 3GPP-LTE (Long Term Evolution). According to 3GPP-LTE, a CN (Core network) and a UTRAN (UMTS Terrestrial Radio Access Network) are connected by an IP network. In data transport, a tunnel is established between the CN and the UTRAN. User data in the IP network is identified by identification information of the tunnel. This allows, for instance, transport of the data from the CN to an appropriate terminal (UE).

A TEID (Tunnel Endpoint Identifier) is typically used as identification information of the tunnel. The TEID is assigned when setting the tunnel. Assignation of the TEIDs is executed in the CN and the UTRAN. The TEIDs are exchanged between the CN and the UTRAN when respective RABs (Radio Access Bearer) are established. The TEIDs used for down link transport are assigned by the UTRAN and notified to the CN, and the TEIDs used for up link transport are assigned by the CN and notified to the UTRAN.

Figure 1:
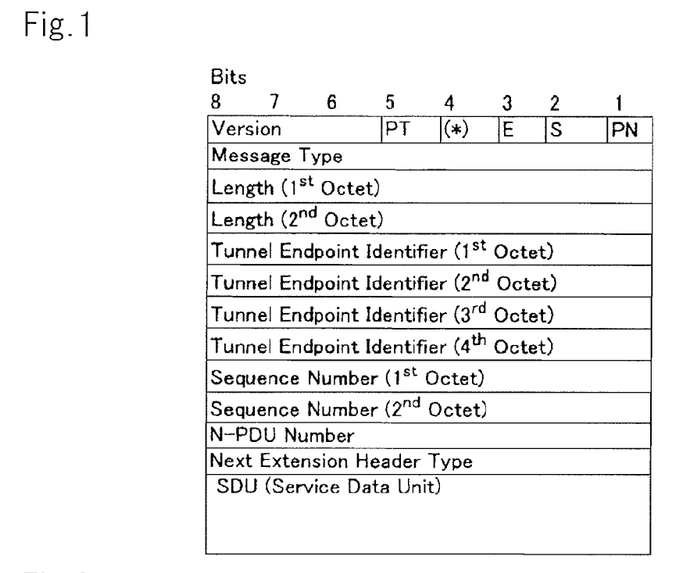
FIG. 1 is a diagram showing an exemplary configuration of a GTP-U header.

GTP (GPRS Tunnel Protocol) is used for actual data transport. A header of GTP-U, or U-Plane (User Plane) in GTP, is added to a packet (data packet) for transporting actual data. FIG. 1 is a diagram showing an exemplary configuration of the GTP-U header. Referring to FIG. 1, four octets of TEID are assigned to the GTP-U header.

The transmitting side apparatus transmits a data packet having the TEID assigned to the GTP-U header. The receiving side apparatus identifies the user data based on the TEID in the received data packet. For instance, with respect to down link data, the CN transmits a data packet having the TEID assigned to the GTP-U header. The UTRAN identifies the user (UE) with reference to the TEID assigned to the GTP-U header in the received data packet, and maps the data to a radio channel corresponding to the UE.

In 3GPP-LTE, an MBMS (Multimedia Broadcast/Multicast Service) that multicasts the same data to UEs is provided (see "Japanese Patent Laid-Open No. 2004-135260", "3GPP TS25.413 V7.4.0 (2006-12), 'UTRAN Iu interface RANAP signaling (Release 7)'", and "3GPP TS25.414 V7.1.0 (2006-09), 'UTRAN Iu interface data transport & transport signaling'"). According to the MBMS, in contrast to typical data communication, data is transported only in the down link. As described above, the TEID in the down link is assigned by the UTRAN and notified to the CN. Thus, according to the MBMS, the TEID is assigned only in the UTRAN, but is not done in the CN. The CN only transmits the data using the notified TEID.

DISCLOSURE OF THE INVENTION

Figure 2:
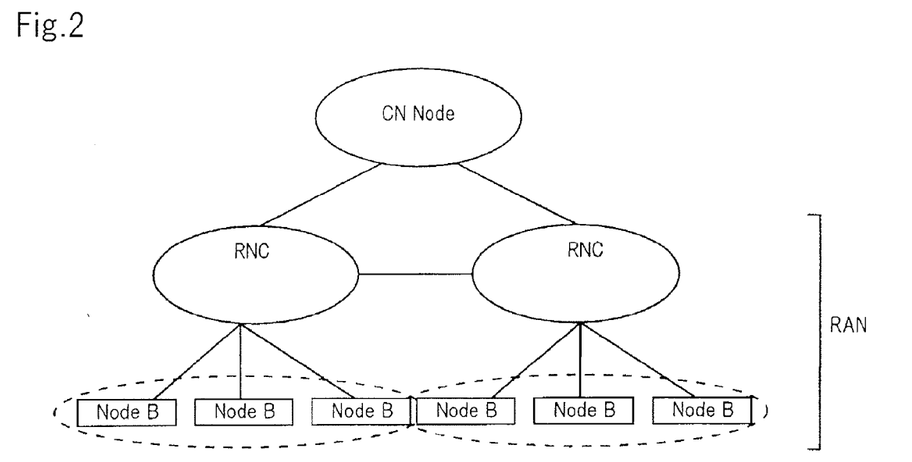
FIG. 2 is a block diagram showing a configuration of a mobile communication system.

FIG. 2 is a block diagram showing a configuration of a mobile communication system. Referring to FIG. 2, a CN Node is connected to control apparatuses (RNCs: Radio Network controllers). Each of RNCs accommodates Node Bs. A radio access network (RAN: Radio Access Network) such as the UTRAN includes the RNCs and the Node Bs.

It is preferable that base stations in the entire areas be capable of providing the service with respect to deployment of the MBMS service. For instance, it is preferable that a mobile TV service be uniformly deployed over a country. In this case, it is required that the CN be capable of multicasting the MBMS data to the Node Bs in the entire areas.

As described above, the TEID in the down link is designated by the RAN to the CN. Since each RAN independently assigns the TEID without cooperation, the TEIDs assigned by the respective RANs have a value different from each other. Accordingly, the CN is required to execute complicated processing to manage a plurality of TEIDs for an MBMS and multicast data using those TEIDs. Since a plurality of TEIDs are managed for an MBMS, the amount of memory required of the MBMS increases. In the example shown in FIG. 2, the CN is required to manage the TEIDs notified by a plurality of RNCs with respect to an MBMS.

Figure 3:
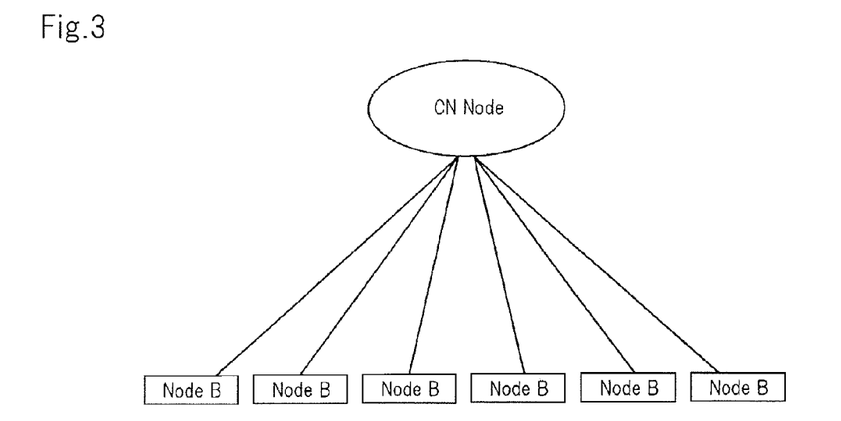
FIG. 3 is a block diagram showing a configuration of 3GPP-LTE mobile communication system.

According to 3GPP-LTE, there exists no control apparatus that accommodates Node Bs in a bundle in the UTRAN, thereby the CN faces to the Node Bs via an IP network. FIG. 3 is a block diagram showing a configuration of a 3GPP-LTE mobile communication system. Referring to FIG. 3, the CN directly faces to the Node Bs in 3GPP-LTE.

Figure 4:
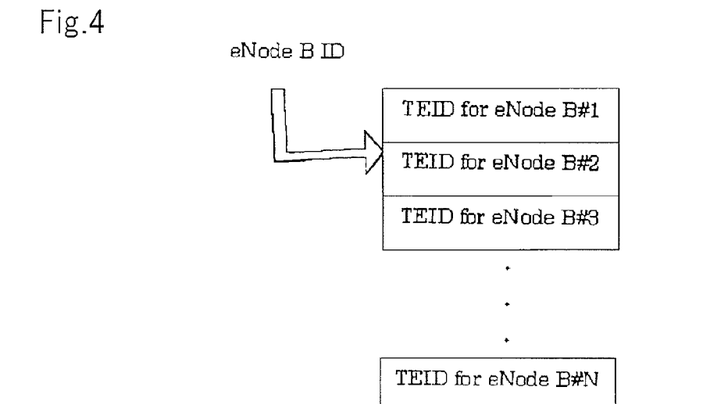
FIG. 4 is a diagram showing the management status of TEIDs in a CN of 3GPP-LTE.

FIG. 4 is a diagram showing a management status of the TEID in the CN of 3GPP-LTE. As shown in FIG. 4, the CN manages the TEIDs, which are assigned by the respective Node Bs, in relation to Node B IDs. The CN then retrieves the TEID corresponding to the Node B and uses the TEID for transporting data. According to such configuration of 3GPP-LTE, the number of TEIDs to be managed by the CN becomes larger than that of the configuration in FIG. 2 where the control apparatuses that bundle Node Bs in the UTRAN assign the TEIDs in the down link.

In this case, the amount of memory that the CN should secure in order to hold the TEIDs is (the length of a TEID)×(the number of Node Bs). For instance, in the case where the length of the TEID is four bytes and the number of Node Bs is ten thousand, the CN is required to secure 40 Kbytes of memory for a service of MBMS. Further, in the case where the number of services that can simultaneously be provided is 10, the CN is required to secure 400 Kbytes of memory in order to manage the TEIDs.

It is an object of the present invention to provide a mobile communication system that reduces the amount of data of identification information used for multicast data communication managed by a core network.

In order to achieve the above-mentioned object, a mobile communication system according to an aspect of the present invention is a mobile communication system that includes a core network and an access network and can distribute multicast data in a down link, comprising:

a core network apparatus that makes up the core network, notifies a piece of identification information on each service for receiving the multicast data in the down link to the access network, and transmits the multicast data to the access network in a receivable form on the basis of the piece of the identification information; and an access network apparatus that makes up the access network, receives the piece of the identification information notified from the core network, capture a radio channel for the service identified by the piece of the identification information, receives the multicast data transmitted from the core network on the basis of the piece of the identification information, and transmits the received multicast data to a terminal over the radio channel.

A multicast data distribution method according to an aspect of the present invention is a multicast data distribution method for distributing multicast data by a mobile communication system including a core network and an access network, comprising:

in the core network apparatus making up the core network, notifying a piece of identification information on each service for receiving the multicast data in a down link to the access network apparatus making up the access network;

in the access network apparatus, receiving the piece of the identification information notified from the core network apparatus, and capturing a radio channel for a service identified by the piece of the identification information;

in the core network apparatus, transmitting the multicast data to the access network in a receivable form on the basis of the piece of the identification information; and in the access network apparatus, receiving the multicast data transmitted from the core network on the basis of the piece of the identification information, and transmitting the received multicast data to a terminal over the radio channel.

A core network apparatus according to an aspect of the present invention is a core network apparatus making up a core network in a mobile communication system that includes the core network and an access network and that can distribute multicast data in a down link, comprising:

a session controller that notifies a piece of identification information on each service for receiving the multicast data in the down link to the access network, and causes an access network apparatus making up the access network to capture a radio channel; and a data distributor that transmits the multicast data to the access network apparatus in a receivable form on the basis of the piece of the identification information, and that causes the access network apparatus to transmit the multicast data over the radio channel.

An access network apparatus according to the present invention is an access network apparatus making up an access network in a mobile communication system that includes a core network and the access network and that can distribute multicast data in a down link, comprising:

a mapping controller that receives, from the core network apparatus making up the core network, notification of a piece of identification information on each service for receiving the multicast data in the down link, and captures a radio channel for the service identified by the piece of the identification information; and a data processor that receives the multicast data transmitted on the basis of the piece of the identification information in a receivable form from the core network apparatus on the basis of the notified piece of the identification information, and transmits the received multicast data to the terminal over the radio channel.

BEST MODE FOR CARRYING OUT THE INVENTION

Exemplary embodiments for carrying out the present invention will be described in detail with reference to the drawings.

First Exemplary Embodiment

Figure 5:
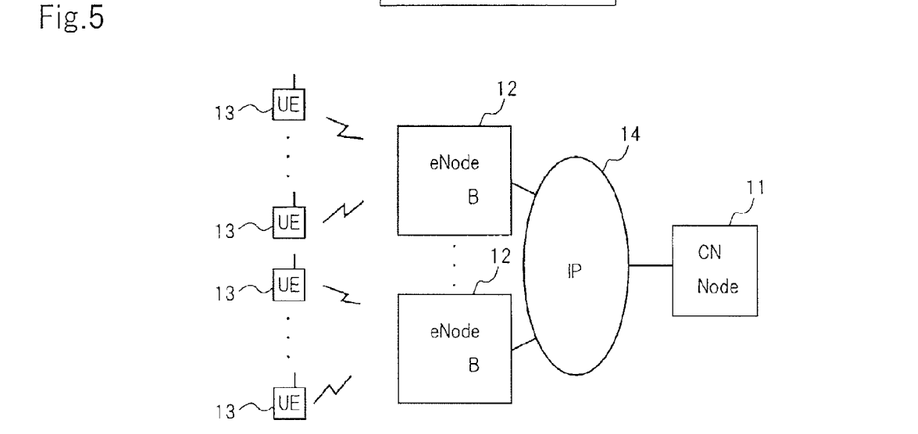
FIG. 5 is a block diagram showing a configuration of a mobile communication system according to a first exemplary embodiment.

FIG. 5 is a block diagram showing a configuration of a mobile communication system according to a first exemplary embodiment. Here is shown an example of a 3GPP-LTE mobile communication system. Referring to FIG. 5, the mobile communication system includes core network node (CN Node) 11, base station apparatus (e Node B) 12, and terminal (UE) 13. Core network node 11 and base station apparatus 12 are connected to each other via IP network 14.

Core network node 11 is an apparatus making up a core network, establishes a tunnel on establishment of a session with each base station apparatus 12 after the process of joining terminal 13 to an MBMS, and distributes MBMS data using the tunnel. It should be noted that the core network is also referred to as ASGW (Access Gateway), Access Anchor, EPC (Evolved Packet Core) or the like.

Base station apparatus 12 is a base station apparatus (e Node B) making up a UTRAN that is an access network, establishes a tunnel on establishment of a session with core network node 11, and establishes a radio channel with terminal 13. Subsequently, base station apparatus 12 receives data distributed from core network node 11, maps the data to the radio channel, and distributes the data to terminal 13.

After terminal 13 executes a process for joining the MBMS with core network node 11, it receives the data distributed from core network node 11 via base station apparatus 12.

Since an MBMS data packet is distributed in the down link from core network node 11 to base station apparatus 12, core network node 11 and base station apparatus 12 only establish down link tunnels. In establishment of a tunnel according to this exemplary embodiment, core network node 11 assigns a tunnel identifier (tunnel ID) and notifies base station apparatus 12 of the tunnel ID. Core network node 11 determines a tunnel ID for an MBMS service, and notifies each base station apparatus 12 of the tunnel ID. Since the tunnel IDs are determined by core network node 11, the tunnel IDs vary from node 11 to node 11, but are common to all base station apparatuses 12 that connect to the same core network 11.

Core network node 11 transmits the MBMS data packet assigned with the tunnel ID to IP network 14 when distributing the data. Base station apparatus 12 identifies the MBMS data packet among the packets received from IP network 14 using the tunnel ID notified by core network node 11.

Figure 6:
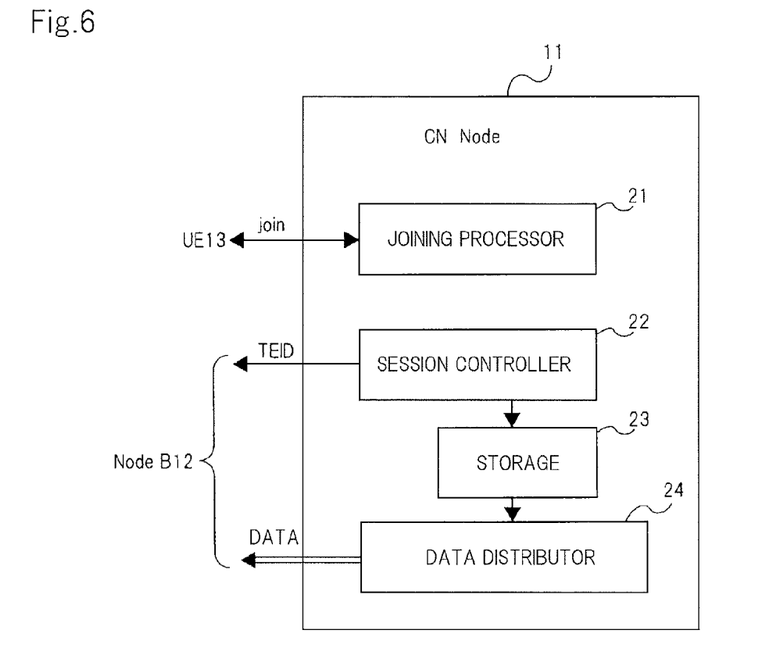
FIG. 6 is a block diagram showing a configuration of a core network node according to the first exemplary embodiment.

FIG. 6 is a block diagram showing a configuration of the core network node according to the first exemplary embodiment. Referring to FIG. 6, core network node 11 includes joining processor 21, session controller 22, storage 23, and data distributor 24.

Joining processor 21 executes processing to join terminal 13 to the MBMS. In the joining processing, joining processor 21 notifies terminal 13 of service identifier (service ID) for identifying a service of the MBMS.

Session controller 22 executes processing to establish an MBMS session with base station apparatus 12. In this session establishment processing, session controller 22 establishes a tunnel ID common to each base station apparatus 12, stores the tunnel ID in storage 23, and notifies each base station apparatus 12 of the tunnel ID.

Storage 23 stores the tunnel ID of each MBMS that has been assigned by session controller 22.

Data distributor 24 generates an MBMS data packet, assigns the tunnel ID stored in storage 23 to the packet, and transmits the packet to IP network 14.

Figure 7:
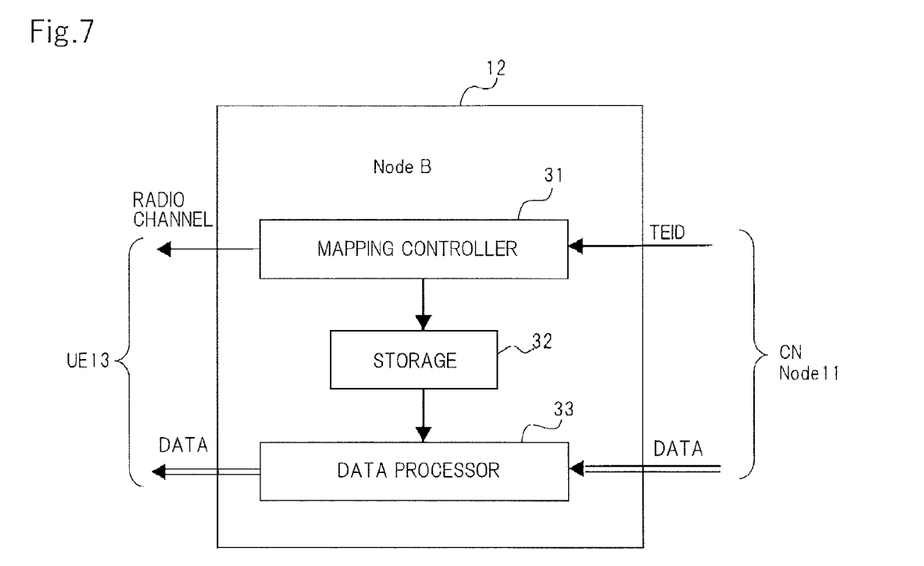
FIG. 7 is a block diagram showing a configuration of a base station apparatus according to the first exemplary embodiment.

FIG. 7 is a block diagram showing a configuration of the base station apparatus according the first exemplary embodiment. Referring to FIG. 7, base station apparatus 12 includes mapping controller 31, storage 32, and data processor 33.

Mapping controller 31 executes processing to establish the MBMS session with core network node 11, and processing to allocate radio channels. In the session establishment processing, the tunnel ID of the tunnel to core network node 11 is notified from core network node 11. In the radio channel allocation processing, mapping controller 31 notifies terminal 13 of information on the radio channel assigned to the MBMS.

Mapping controller 31 also stores in storage 32 mapping information between the tunnel IDs notified in the MBMS session establishment processing and the radio channels allocated in the radio channel allocation processing.

Storage 32 stores the mapping information defined by mapping controller 31.

Data processor 33 identifies the MBMS data packet with reference to the tunnel ID of the packet received from IP network 14, and determines the corresponding radio channel with reference to the mapping information stored in storage 32. Data processor 33 then maps the MBMS data to the radio channel and transmits the data to terminal 13.

Figure 8:
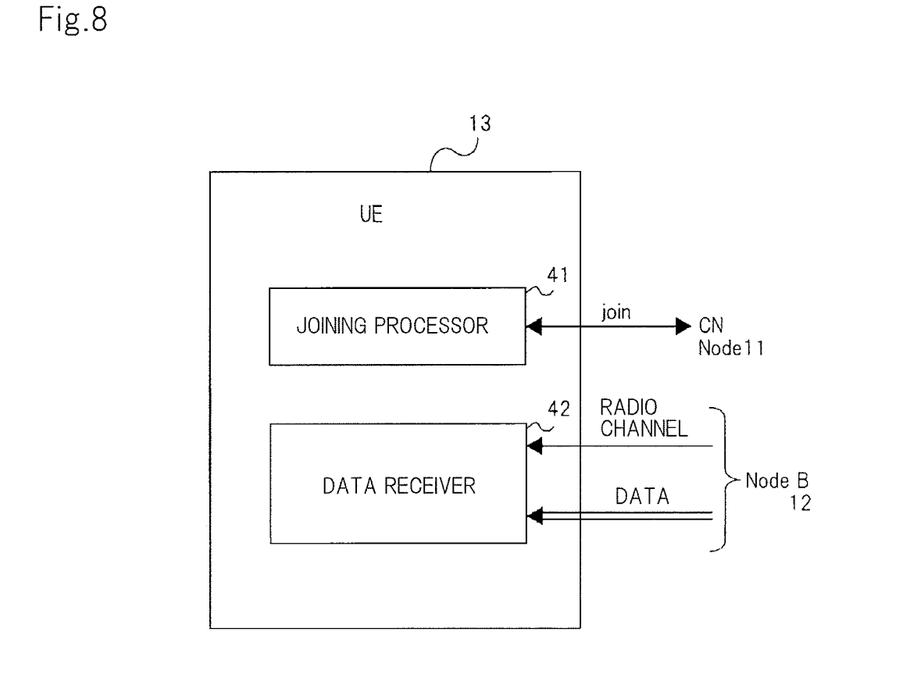
FIG. 8 is a block diagram showing a configuration of a terminal according to the first exemplary embodiment.

FIG. 8 is a block diagram showing a configuration of the terminal according to the first exemplary embodiment. Referring to FIG. 8, terminal 13 includes joining processor 41 and data receiver 42.

Joining processor 41 executes processing of joining to the MBMS with core network node 11. Joining processor 41 acquires the service ID for identifying the MBMS service that is notified from core network node 11.

Data receiver 42 receives notification of the radio channel information allocated to the MBMS by base station apparatus 12, and subsequently receives the MBMS data transmitted from base station apparatus 12 via the radio channel.

Figure 9:
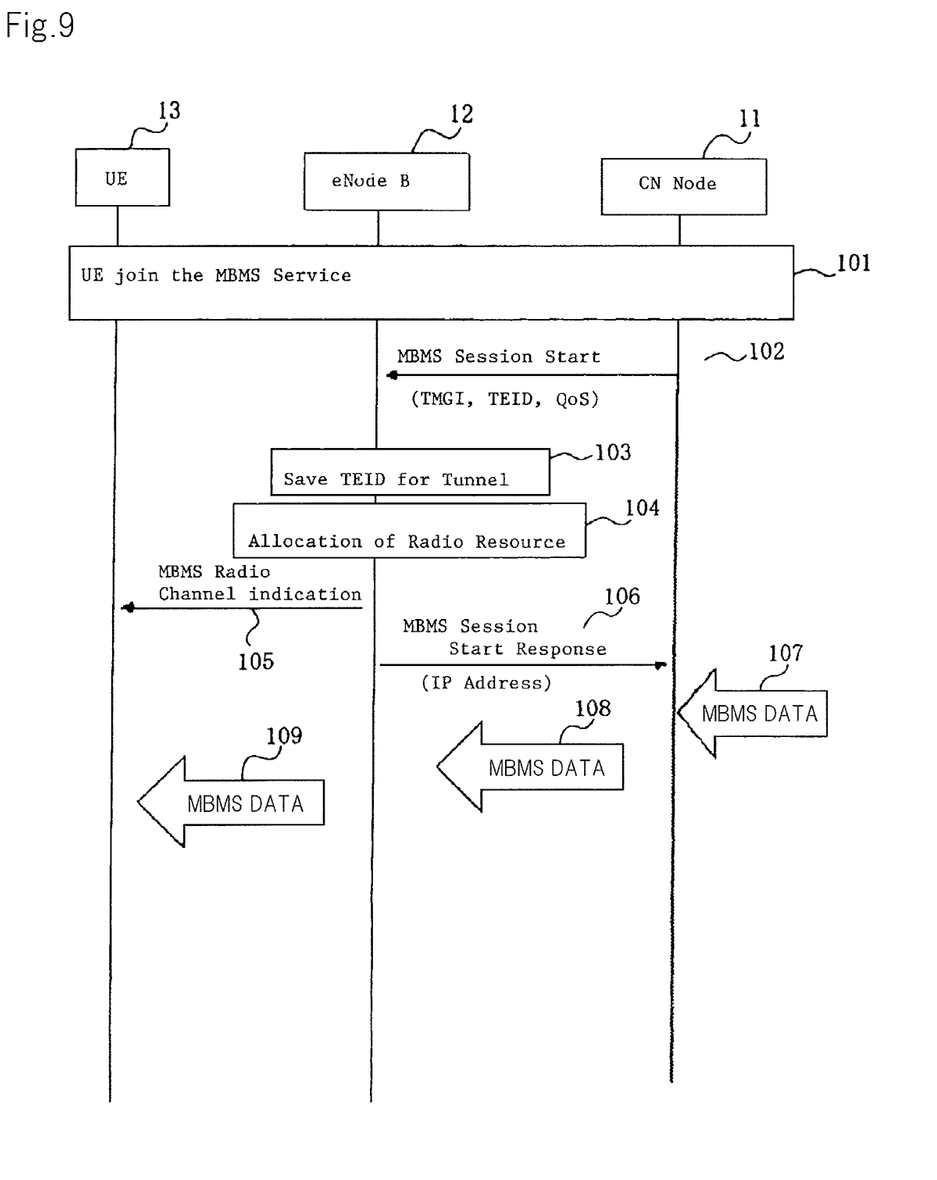
FIG. 9 is a sequence diagram showing an operation of MBMS data communication by the mobile communication system according to the first exemplary embodiment.

FIG. 9 is a sequence diagram showing an operation of MBMS data communication by the mobile communication system according to the first exemplary embodiment. Here, a control protocol on an S1 interface between core network node 11 and base station apparatus 12 is referred to as eRANAP (Radio Access Network Application Part). eRANAP that is a protocol that transmits and receives a connection-type control message is provided here.

Referring to FIG. 9, terminal 13 and core network node 11 execute processing to join terminal 13 to the MBMS (step 101). This processing allows terminal 13 to be joined to the MBMS. The joining enables terminal 13 to receive the MBMS data.

Next, core network node 11 transmits an MBMS session start message (MBMS Session Start) of eRANAP to base station apparatus 12 (step 102). The MBMS session start message includes a TMGI (Temporary Mobile Group Identity) that is a service ID, a TEID (Tunnel Endpoint Identifier) that is a tunnel ID, determined by core network node 11, and QoS (Quality of Service) information. The value of the TEID is determined by core network node 11. The QoS information designates a bit rate and the like of the MBMS.

Figure 10:
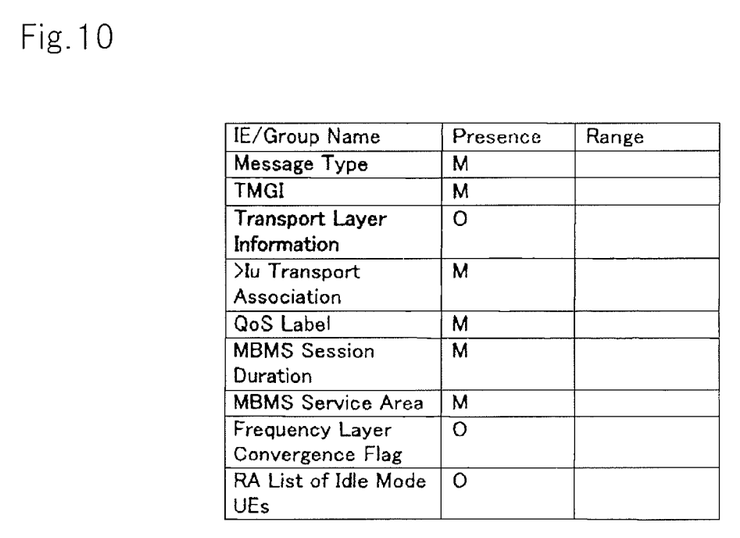
FIG. 10 is a diagram showing an exemplary configuration of a session start message.

FIG. 10 is a diagram showing an exemplary configuration of the session start message. The TMGI is entered as a "TMGI" information element included in the message shown in FIG. 10. The QoS is entered as a "QoS Label" information element. As an "Iu Transport Association" information element, the TEID is entered. These are mandatory (Presence=M (Mandatory)) information elements for the session start message in this example. It should be noted that optional information elements are represented as Presence=O (Option) in FIG. 10.

Base station apparatus 12 having received the MBMS session start message stores the TEID included in the message (step 103). For instance, the TEID can be included in the MBMS session start message as the information element that indicates relationship of transport on the S1 interface (S1 Transport Association). In this case, base station apparatus 12 acquires the information element from the MBMS session start message and stores the information element, and holds the information element during duration of the MBMS session. Base station apparatus 12 also stores the QoS.

Subsequently, base station apparatus 12 executes processing to allocate radio channels according to the QoS information (step 104). This processing for allocating the radio channels allows base station apparatus 12 to capture the radio channel and define mapping information between the TEID and the radio channel. Furthermore, base station apparatus 12 notifies terminal 13 of the radio channel by the MBMS Radio Channel indication message (step 105).

When the mapping is defined and the allocation of radio access bearer is completed, base station apparatus 11 notifies core network node 11 of the completion of the allocation by transmitting an MBMS Session Start Response message (step 106). The MBMS session start response message includes the IP address assigned by base station apparatus 12 as a transport layer address (Transport Address).

Although the procedure where base station apparatus 11 transmits the MBMS session start response message to core network node 11 after the capture of the radio channel (step 106) has been exemplified, the present invention is not limited thereto. As another example, a procedure where base station apparatus 11, when receiving the MBMS session start message in step 102, transmits the MBMS session start message to core network node 11 and then captures the radio channel, may be adopted.

After establishment of the MBMS session, core network node 11 acquires the MBMS data from an MBMS server, which is not shown (step 107), and distributes the MBMS data assigned with the TEID to base station apparatus 12 (step 108). The TEID is included in the GTP-U header of the MBMS data packet.

A transport bearer for MBMS is identified based on the TEID included in the GTP-U header and the IP address. While the IP address is assigned by base station apparatus 12, the TEID is assigned by core network node 11.

Base station apparatus 12 receives the MBMS data, identifies the tunnel with reference to the mapping information based on the TEID included in the GTP-U header, and maps the MBMS data to the radio channel to terminal 13 according to the mapping information (step 109). Thus, the MBMS data is wirelessly transmitted from base station apparatus 12 to terminal 13. Terminal 13 receives the MBMS data over the radio channel.

As described above, according to this exemplary embodiment, because core network node 11 determines one tunnel ID of a tunnel, which transmits the MBMS data, for one service and notifies each base station apparatus 12 of the tunnel ID, the necessary for core network node 11 to manage different tunnel IDs for respective base station apparatuses 12 for the sake of multicasting is eliminated, thereby simplifying the processing and reducing the amount of memory.

Although this exemplary embodiment has exemplified the 3GPP-LTE mobile communication system where core network node 11 and base station apparatus 12 directly face to each other via IP network 14, the present invention is not limited thereto. As another example, a mobile communication system with a configuration, where a control apparatus that bundles the base stations exists between the core network node and the base stations, may be adopted. In such a case where the access network includes the control apparatus and the base station, the core network node may notify the control apparatus of the determined tunnel ID, or may notify the base station apparatus of the determined ID via the control apparatus.

Second Exemplary Embodiment

According to the first exemplary embodiment, the core network node determines the tunnel ID. On the other hand, a second exemplary embodiment uses a service ID that takes on a value specific to the MBMS service as the tunnel ID. This eliminates the need for processing where the core network node determines the tunnel ID, in the second exemplary embodiment.

However, the tunnel ID of a tunnel for transporting typical data other than that of the MBMS is determined by the core network node and the base station apparatus and is exchanged with each other, as in the related art. Thus, it is preferable to prevent overlap between the tunnel ID of the tunnel for transporting the MBMS data that is fixedly determined according to the service ID and the tunnel ID of the tunnel for transporting the data other than that of MBMS. Accordingly, this exemplary embodiment adds indication information indicating whether the data is the MBMS data or not to a packet. This eliminates inconvenience due to overlap between the tunnel IDs.

By way of example, a predetermined bit of the tunnel ID may preferably be used as the indication information indicating whether the data is the MBMS data or not. By way of a more specific example, it may preferably be prescribed that the data be the MBMS data when the eighth bit of the first octet in the TEID of the GTP-U header shown in FIG. 1 is "1" and the data be not the MBMS data when the bit is "0".

Figure 11:
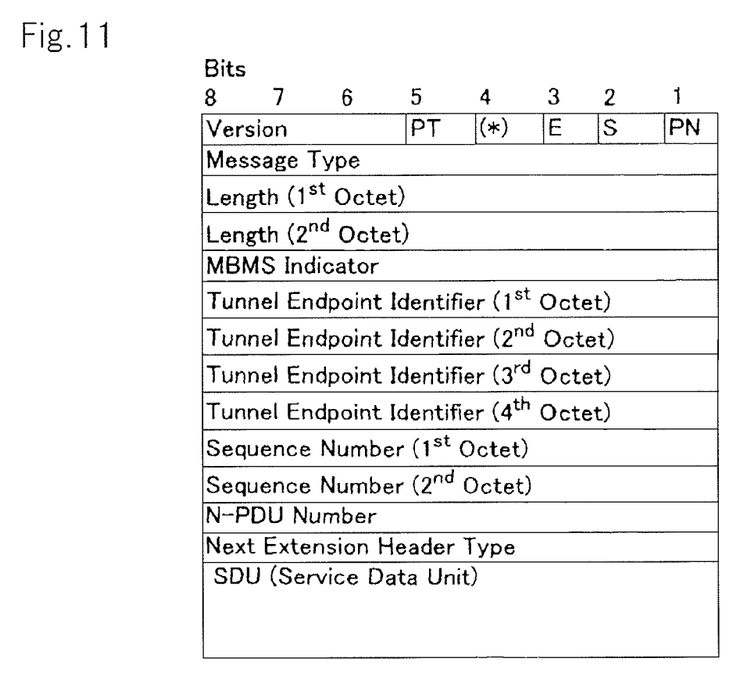
FIG. 11 is a diagram showing an exemplary configuration of a GTP-U header.

By way of another example, it is preferable to add an information element representing whether the data is the MBMS data or not in addition to the tunnel ID. By way of a more specific example, as shown in FIG. 11, an information element of an MBMS Indicator may preferably be added before the TEID of the GTP-U header.

A mobile communication system according to the second exemplary embodiment has a configuration substantially identical to that of the first exemplary embodiment shown in FIG. 5. Core network node 11, base station apparatus 12, and terminal 13 also have configurations substantially identical to those of the first exemplary embodiment shown in FIGS. 6, 7 and 8.

In this exemplary embodiment, in contrast to the first exemplary embodiment, core network node 11 does not determine the tunnel ID by itself. Instead, core network node 11 uses a service ID indicating the MBMS service as the tunnel ID, and notifies base station apparatus 12 of the tunnel ID. Core network node 11 adds the tunnel ID (=service ID) and the MBMS indication information to the MBMS data packet when distributing the MBMS data.

Base station apparatus 12 holds the tunnel ID notified from core network node 11, and identifies the distributed MBMS data packet by the tunnel ID and the MBMS indication information.

Figure 12:
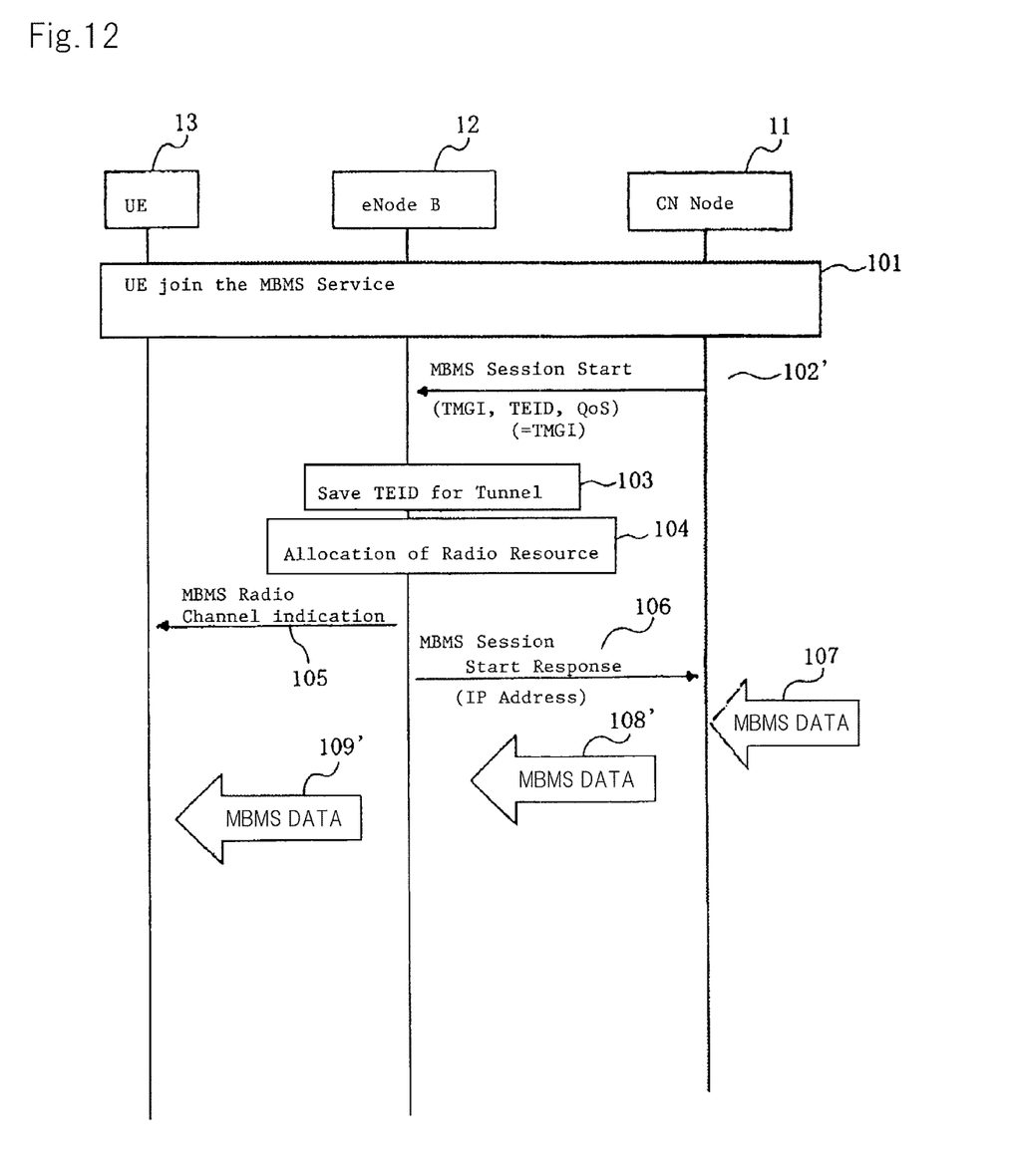
FIG. 12 is a sequence diagram showing an operation of MBMS data communication by a mobile communication system according to a second exemplary embodiment.

FIG. 12 is a sequence diagram showing an operation of the MBMS data communication by the mobile communication system according to the second exemplary embodiment. Here, a different part where the second exemplary embodiment is different from the first exemplary embodiment will mainly be described.

Referring to FIG. 12, according to this exemplary embodiment, core network node 11 transmits to base station apparatus 12 the MBMS session start message via the eRANAP as step 102' subsequent to step 101. The MBMS session start message includes, for instance, the TMGI, the TEID and the QoS information. The TMGI is used, as is, for the TEID. By way of another example, the MBMS session start message may exclude the TEID field. In this case, base station apparatus 12 may acquire the TMGI as the TEID.

Base station apparatus 12 having received MBMS session start message acquires and holds the TEID (=TMGI), the QoS, and other session attribution information included in the message in step 103. For instance, the QoS is included in the MBMS session start message as an information element that is a parameter (RAB Parameter) of a radio access bearer or an information element in the QoS level. In this exemplary embodiment TMGI means the TMGI identifier that individually identifies the MBMS services and also means the TEID that relates the transport layer.

When the establishment of the MBMS session is completed in step 106, core network node 11 distributes to base station apparatus 12 the MBMS data packet having the TEID (=TMGI) and the MBMS indication information added to the GTP-U header (step 108').

The transport bearer for MBMS data is identified based on the TEID included in the GTP-U header and the IP address.

Although the IP address is assigned by base station apparatus 12, the TEID has the same value as the TMGI.

Base station apparatus 12 receives the MBMS data to which the MBMS indication information is added, identifies the tunnel with reference to the mapping information based on the TEID included in the GTP-U header, and maps the MBMS data to the radio channel to terminal 13 according to the mapping information (step 109').

As described above, according to this exemplary embodiment, core network node 11 notifies each base station apparatus 12 of the service ID, which is for identifying the MBMS service, as the tunnel ID of the tunnel that transports the MBMS data. This eliminates the necessity for core network node 11 to manage the different tunnel IDs for the different base station apparatuses 12 for the sake of multicasting, thereby simplifying the processing and reducing the amount of memory. It is unnecessary that base station apparatus 12 or core network node execute processing of determining the tunnel ID.

Third Exemplary Embodiment

According to the first and second embodiments, the MBMS data is distributed from core network node 11 using the packet having the TEID included in the GTP-U header. On the other hand, according to a third exemplary embodiment, the MBMS data is distributed from core network node 11 by IP multicasting.

Thus, in the third exemplary embodiment, core network node 11 notifies base station apparatus 12 of an IP multicast address when establishing a session. Base station apparatus 12 joins an IP multicast group indicated by the IP multicast address. The MBMS data packet is distributed by an IP multicast router in IP network 14 to base station apparatus 12 that joins the IP multicast group.

A mobile communication system according to the third exemplary embodiment has a substantially identical configuration according to the first exemplary embodiment shown in FIG. 5. Since, in this exemplary embodiment, the MBMS data is distributed by IP multicasting, the IP multicast router is required in IP network 14. Core network node 11, base station apparatus 12 and terminal 13 also have configurations substantially identical to those of the first exemplary embodiment shown in FIGS. 6, 7 and 8.

According to this exemplary embodiment, in contrast to the first exemplary embodiment, core network node 11 determines the IP multicast address used for distributing the MBMS data, and notifies base station apparatus 12 of the address. Core network node 11 then adds the IP multicast address to the MBMS data packet when distributing the MBMS data. The MBMS data packet to which the IP multicast address has been added is distributed to each base station apparatus 12 that joins the IP multicast group by the IP multicast router in IP network 14.

Base station apparatus 12 joins the IP multicast group designated by the IP multicast address notified by core network node 11, and receives distribution of the MBMS data packet from the IP multicast router.

Figure 13:
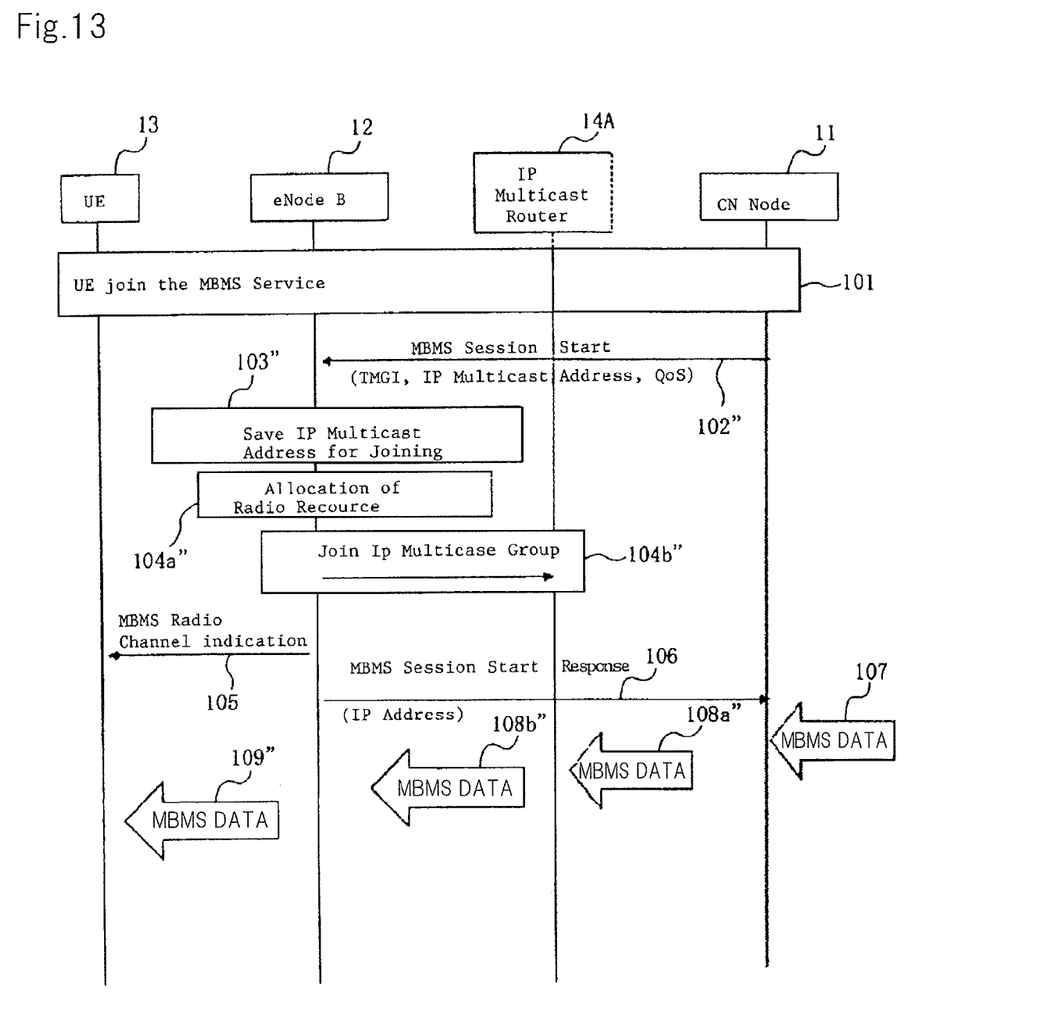
FIG. 13 is a sequence diagram showing an operation of MBMS data communication by a mobile communication system according to a third exemplary embodiment.

FIG. 13 is a sequence diagram showing an operation of the MBMS data communication by the mobile communication system according to the third exemplary embodiment. Here, a different part where the third exemplary embodiment is different from the first or second exemplary embodiments will mainly be described.

Referring to FIG. 13, according to this exemplary embodiment, core network node 11 transmits to base station apparatus 12 the MBMS session start message via the eRANAP as step 102" subsequent to step 101. The MBMS session start message includes the TMGI, the IP multicast address, and the QoS information.

Base station apparatus 12 having received the MBMS session start message acquires and holds the IP multicast address, the QoS, and other session attribution information included in the message in step 103". Base station 12 stores the IP address that is an address of the transport layer on the S1 interface, and holds the IP address during duration of the MBMS session.

Subsequently, base station apparatus 12 captures the radio channel according to the QoS information (step 104a"), joins to the IP multicast group (step 104b"), and defines the mapping information between the IP address of the MBMS data and the radio channel. For instance, a procedure defined in RFC2236 of IETF (Internet Engineer Task Force) may preferably be used for joining the IP multicast group.

Subsequently, base station apparatus 12 notifies terminal 13 of the radio channel by the MBMS Radio Channel Indication message (step 105), and notifies core network node 11 of the completion of the allocation by transmitting the MBMS Session Start Response message (step 106).

The transport bearer for MBMS is identified by the IP multicast address.

After the establishment of the MBMS session, core network node 11 acquires the MBMS data from the MBMS server, which is not shown (step 107), and transmits the MBMS data assigned with the IP multicast address to IP network 14 (step 108"). IP multicast router 14A in IP network 14 distributes the MBMS data to base station apparatus 12 that joins the IP multicast group (108b").

Base station apparatus 12 identifies the MBMS data having been distributed by IP multicast router 14 on the basis of the IP address and receives the data, and maps the MBMS data to the radio channel to terminal 13 according to the mapping information (step 109"). The GTP-U is used for transporting the MBMS data. If a TEID field is mandatory, an IP multicast address field may additionally be allocated, while the TEID field is allocated in the MBMS data packet. For instance, the IP multicast address field may preferably be added to the GTP-U header shown in FIG. 11. Intrinsically speaking, however, this exemplary embodiment does not require the TEID because the TEID is not used for transporting the MBMS data packet. Accordingly, for instance, the TEID field may be assigned with a fixed value in the up link side, and the content of the TEID field may be disregarded in the down link side. In this exemplary embodiment, the TEID field in the GTP-U header of the MBMS data packet may be disregarded in base station apparatus 12, irrespective of whether a certain TEID is assigned in the GTP-U header or not.

As described above, according to this exemplary embodiment, the IP multicast address for transporting the MBMS data is notified from core network node 11 to each base station apparatus 12, and base station apparatus 12 joins the IP multicast group designated by the IP multicast address. This obviates the necessity for core network node 11 to manage the different tunnel IDs for different base station apparatuses 12 for the sake of multicasting, thereby simplifying processing and reducing the amount of memory.

While the present invention has been described with reference to the exemplary embodiments, the present invention is not limited to the embodiments. Other variations that a person skilled in the art will understand may be made to the configurations and details as defined in the claims within the scope of the present invention.

This application claims the benefit of the right of priority on the basis of Japanese Patent Application No. 2007-19071 filed on Jan. 30, 2007, the disclosures of which are incorporated herein by reference in its entirety.

The invention claimed is:

1. A core network in a mobile communication system that also comprises an evolved Node B (eNodeB) and a terminal and provides Multimedia Broadcast/Multicast Service (MBMS) service for delivering multicast data, the core network comprising:
    a transmitter configured to transmit, to the eNodeB, a session start message comprising a Tunnel Endpoint Identifier (TEID) that is used for data transfer between the eNodeB and the core network,
    wherein the session start message is a control message which comprises a transport network layer information element comprising the TEID,
    wherein the session start message comprises a temporary mobile group identity, and
    wherein the temporary mobile group identity is used as the TEID.

2. The core network according to claim 1,
    wherein the core network is further configured to transmit an Internet Protocol (IP) multicast address to the eNodeB.

3. An evolved Node B (eNodeB) in a mobile communication system that comprises a terminal and a core network and provides a Multimedia Broadcast/Multicast Service (MBMS) service for delivering multicast data, the eNodeB comprising:
    a first receiver configured to receive, from the core network, a session start message comprising a Tunnel Endpoint Identifier (TEID) that is used for data transfer between the eNodeB and the core network,
    wherein the session start message is a control message which comprises a transport network layer information element comprising the TEID,
    wherein the session start message comprises a temporary mobile group identity, and
    wherein the temporary mobile group identity is used as the TEID.

4. The eNodeB according to claim 3,
    wherein the evolved Node B (eNodeB) is further configured to receive an Internet Protocol (IP) multicast address from the core network.

5. A terminal in a mobile communication system that also comprises a core network and an evolved Node B (eNodeB), and provides a Multimedia Broadcast/Multicast Service (MBMS) service for delivering multicast data, the terminal comprising:
    a data receiver configured to receive the multicast data from the eNodeB in response to the eNodeB receiving, from the core network, a session start message comprising a Tunnel Endpoint Identifier (TEID) that is used for data transfer between the evolved Node B (eNodeB) and the core network, and
    wherein the session start message is a control message which comprises a transport network layer information element comprising the TEID,
    wherein the session start message comprises a temporary mobile group identity, and
    wherein the temporary mobile group identity is used as the TEID.

6. The terminal according to claim 5,
    wherein the core network is configured to transmit an Internet Protocol (IP) multicast address to the eNodeB.

7. The terminal according to claim 5,
    wherein the terminal is further configured to perform a procedure for joining to the MBMS service.

8. A multicast data distribution method in a core network in a mobile communication system that provides a Multimedia Broadcast/Multicast Service (MBMS) service for delivering multicast data, the multicast data distribution method comprising:
    transmitting, to an evolved Node B (eNodeB), a session start message comprising a Tunnel Endpoint Identifier (TEID) that is used for data transfer between the eNodeB and the core network; and
    distributing the multicast data to the evolved Node B (eNodeB),
    wherein the session start message is a control message which comprises a transport network layer information element comprising the TEID,
    wherein the session start message comprises a temporary mobile group identity, and
    wherein the temporary mobile group identity is used as the TEID.

9. A multicast data distribution method in an evolved Node B (eNodeB) in a mobile communication system that provides a Multimedia Broadcast/Multicast Service (MBMS) service for delivering multicast data, the multicast data distribution method comprising:
    receiving, from a core network, a session start message comprising a Tunnel Endpoint Identifier (TEID) that is used for data transfer between the eNodeB and the core network; and
    transmitting the multicast data to a terminal,
    wherein the session start message is a control message which comprises a transport network layer information element comprising the TEID,
    wherein the session start message comprises a temporary mobile group identity, and
    wherein the temporary mobile group identity is used as the TEID.

10. A multicast data distribution method in a terminal in a mobile communication system that provides a Multimedia Broadcast/Multicast Service (MBMS) service for delivering multicast data, comprising:
    receiving the multicast data from an evolved Node B (eNodeB),
    wherein the eNodeB receives, from a core network, a Tunnel Endpoint Identifier (TEID) that is used for data transfer between the eNodeB and the core network,
    wherein the session start message is a control message which comprises a transport network layer information element comprising the TEID,
    wherein the session start message comprises a temporary mobile group identity, and
    wherein the temporary mobile group identity is used as the TEID.

* * * * *